United States Patent Office 3,326,734
Patented June 20, 1967

3,326,734
WATER RESISTANT INORGANIC NITRATE BASED
EXPLOSIVE COMPOSITION
Thomas E. Slykhouse, Midland, Mich., assignor to The
Dow Chemical Company, Midland, Mich., a corporation of Delaware
No Drawing. Filed June 29, 1966, Ser. No. 561,324
10 Claims. (Cl. 149—41)

ABSTRACT OF THE DISCLOSURE

An explosive composition comprising a particulate inorganic oxidizer, preferably ammonium nitrate, a substantially saturated aqueous solution of magnesium nitrate, ammonium nitrate or an aqueous ammoniacal ammonium nitrate solution and setting agent which sets the composition to a solid material which contains the solvent used in the liquid phase. These compositions have a relatively high density and are water resistant.

---

This application is a continuation-in-part of application Ser. No. 355,926 filed March 30, 1964, now abandoned.

This invention relates to inorganic based explosives and more particularly is concerned with a novel water resistant inorganic nitrate based explosive composition.

It is a principal object of the present invention to provide an explosive system which sets up into a hard, dense mass.

It is another object of the present invention to provide an explosive composition having a density greater than 1 gram per cubic centimeter and which has good sensitivity to shock initiation and delivers high quantities of working energy upon detonation.

It is also an object of the present invention to provide a novel, relatively dense inorganic based explosion composition that exhibits good resistance to degradation by water.

These and other objects and advantages readily will become apparent from the detailed description presented hereinafter.

In general the present novel composition comprises a particulate inorganic oxidizer, a substantially saturated solution selected from the group consisting of aqueous magnesium nitrate, aqueous ammonium nitrate and aqueous ammoniacal ammonium nitrate and a setting agent which sets the explosive composition to a solid material containing solvent used in the liquid phase. One embodiment of the present novel invention comprises from about 40 to about 75 parts by weight particulate ammonium nitrate, from about 20 to about 35 parts by weight of an aqueous solution of magnesium nitrate or ammonium nitrate or an aqueous ammoniacal solution of ammonium nitrate and a minimum of about 2 parts by weight of certain specific inorganic salts or oxides as setting agent. Ordinarily from about 2 to about 10 parts by weight or more of the setting agent are used. Preferably the present novel explosive composition comprises from about 50 to about 70 parts by weight prilled or granular ammonium nitrate, from about 22 to about 28 parts by weight of the saturated aqueous magnesium nitrate or ammonium nitrate solution or saturated aqueous ammoniacal ammonium nitrate solution and from about 4 to about 8 parts by weight magnesium oxide as setting agent.

Suitable inorganic oxides or salts for use in the present composition as setting agents are those materials which will dissolve or react with any ammoniacal or aqueous nitrate solution to set the composition to a solid material which contains the solvent used in the liquid phase. Preferably these materials react over a period of time and do not react with water or ammonia in a highly exothermic manner with rapid release of large quantities of heat. Illustrative examples of inorganic metal oxides and inorganic metal salts suitable for use as setting agents are the alkaline earth metal oxides (i.e., calcium oxide, strontium oxide, barium oxide and magnesium oxide), zinc oxide, lead monoxide, calcined dolomitic limestone (i.e., a mixture of calcium oxide and magnesium oxide) and the substantially anhydrous salts, calcium sulfate, sodium sulfate, magnesium sulfate, sodium tetrapyrophosphate and sodium thiosulfate. Magnesium oxide has been found to be particularly effective. The setting agents can be used alone or mixtures of these can be employed.

The actual amount of setting agent to be employed is dependent to some extent on the water resistivity and sensitivity desired in the composition. As the amount of setting agent increases, the water resistivity of the final composition increases and the sensitivity decreases. This latter effect is particularly evidenced in the compositions containing the larger amounts, e.g., 15–20 percent or more of setting agent. Ordinarily this agent is used in finely divided form. Commercially available powdered materials, such as oxychloride grade magnesite (MgO), usually are used since these provide the required reactivity to promote the setting reaction of the composition at relatively low concentrations.

Ordinarily the aqueous solutions of magnesium nitrate or ammonium nitrate are prepared by dissolving the corresponding solute member in the appropriate solvent either at room temperature or at elevated temperatures. Conveniently, commercially available aqueous ammoniacal solutions saturated with respect to the ammonium nitrate solute at about room temperature and containing from about 6 to about 15 percent water can be used as the ammonium nitrate solution component of the composition.

Both unsaturated and saturated solutions of the nitrate material and eutectic solutions containing the nitrate component in combination with other materials can be employed.

If desired, other fuel components such as particulated light metals, e.g., aluminum, aluminum alloys, magnesium, magnesium alloys and the like can be incorporated into the present composition in an amount up to about 50 parts by weight. The particulation of the light metal is not critical. Relatively large particles have been found to be quite suitable. Conveniently, these are readily available as commercial scrap flakes, chopped foil, machine chips, shavings, turnings and the like.

Organic materials such as alcohols, urea, nitrocarbonitrates, conventionally explosives, sugars, hydrocarbon, etc. also can be dissolved in or otherwise incorporated into or carried in the composition as sensitizers and/or fuels.

Other particulate inorganic oxidizers can be used to replace at least a portion of the solid ammonium nitrate component. Representative examples of such oxidizers are ammonium perchlorate, potassium nitrate, barium nitrate and sodium nitrate.

In preparing the present novel composition, usually the solid particulate oxidizer is blended with the setting agent, e.g. magnesium oxide, (along with other solid components if such are employed) and the saturated nitrate solution and any other liquid components then added to this mixture. As first prepared, the composition ranges in consistency from a viscous paste to a pourable slurry depending upon the amount of solution used. The mix is placed in a suitable cardboard, plastic, wooden, metal or other liquid resistant mold or container and allowed to stand for a predetermined period of time, usually from about 18 to 24 hours or more. During this period the mix cures, i.e. sets, to a hard, dense compact mass. An advantage of the present composition is that it can be cast into any of a wide variety of shapes or forms thereby giving a final explosive charge of predetermined shape for any of a number of specific uses.

The following examples will serve to further illustrate the present invention but are not meant to limit it thereto.

*Example 1.*—A number of explosive compositions were prepared using an oxychloride grade magnesite, aqueous saturated magnesium nitrate or aqueous ammoniacal saturated ammonium nitrate solution and particulate prilled ammonium nitrate. Additionally, some of the mixes also had particulate aluminum fuel incorporated therein. Each composition was fabricated by adding the solution to a substantially homogeneous blend of the solid materials, casting this into a cylindrical cardboard mold and curing the so-cast structure at ambient room temperature for about 24 hours. The mold had a cylindrical projection jutting upward from its bottom thus making a corresponding depression in one end of the charge to accommodate a detonator.

For detonation studies, the cured charge was primed with a commercially available ⅙-pound high explosive booster inserted in the depression. The so-primed charge was positioned in a bore hole in a sandy soil and detonated.

Table I which follows presents charge composition data for a number of different compositions.

A standard lead-block deformation sensitivity test was used. In this test, 100 g. charges were prepared in 1.5 inch diameter small plastic bottles, the final set mix occupying about 0.6 of the volume of the bottle.

A strand of 200 grain per foot Primacord encased in a glass tube was inserted down through the center of the charge as it was first prepared, the final product thus setting up around the Primacord initiator. The bottle containing the so-primed charge was positioned on a ¼-inch thick steel plate which in turn was centered on a lead block in the shape of a regular prism having a 1 inch by 1 inch square base and being about 2 inches high. This lead block was centered on top of a ½-inch thick steel plate about 6 inches on a side.

The Primacord initiator was activated by a No. 6 electric blasting cap. The deformation, i.e. reduction in height of the lead block from detonation of the charge gave a measurement of the sensitivity of the product.

Table II presents charge data and results for a number of compositions.

TABLE II

| Run No. | Charge Composition (parts by weight) | | | | Lead Block Deformation (64ths inch) |
|---|---|---|---|---|---|
| | Particulate Ammonium Nitrate | Saturated Mg(NO₃)₂ Solution | MgO [1] | Al | |
| 1 | Sand (inert control) | | | | 2 |
| 2 | Prilled Ammonium Nitrate (control) | | | | 2 |
| 3 | 70 | 30 | 6 | | 5 |
| 4 | 70 | 30 | 4 | [2] 2.6 | 8 |
| 5 | 66.5 | 28.5 | 3.8 | [2] 5 | 10 |
| 6 | 63 | 27 | 3.6 | [2] 10 | 15 |
| 7 | 73 | 31.2 | 4.15 | [2] 7.5 | 9 |
| 8 | 73 | 31.2 | 4.15 | [2] 12.5 | 11 |
| 9 | 67 | 25 | 2 | [3] 15 | 6.5 |

[1] Oxychloride grade.
[2] Chopped aluminum foil of thickness about 0.001 inch and about ⅙ inch square.
[3] Aluminum curled turnings about 1/32 to 1/16 inch in thickness, 3/16 inch in width and about ¼ to ½ inch in length.

*Example 3.*—A number of studies were made to evaluate the effectiveness of setting agents with aqueous ammonium nitrate solutions. In these studies, a predetermined amount of setting agent was mixed with a pre-

TABLE I

| Mix No. | Ammonium Nitrate | Sat'd Mg(NO₃)₂ Solution, weight percent | Ammonium Nitrate Solution [1] | MgO | Al | Charge Diameter, in. |
|---|---|---|---|---|---|---|
| 1 | 71 | | 23.2 | 5.3 | | 4 |
| 2 | 55.9 | 23.7 | | 4.3 | [2] 16.6 | 5 |
| 3 | 49.8 | 20.0 | | 7.0 | [3] 23.2 | 4 |
| 4 | 51.6 | | 32.8 | 5.3 | 10.3 | 4 |
| 5 | 51.5 | | 28.6 | 4.5 | 15.4 | 4 |

[1] 65.5% NH₄NO₃, 28% NH₃, 6.5% H₂O.
[2] Chopped foil of about 0.001 inch thickness and about 1/16 inch square.
[3] 1 part by weight chopped foil and 6 parts by weight atomized pellets 60 to 100 mesh U.S. Standard Sieve.

These mixes propagated and gave evidence of complete detonation with production of useful explosive power as demonstrated by earth movement and cratering.

*Example 2.*—A number of small sized charges (~100 grams) were prepared following the same general procedure described in Example 1 and their sensitivity to detonation evaluated.

determined quantity of aqueous ammonium nitrate solution (solution contains about 63 percent by weight ammonium nitrate). After the setting agent had been mixed with the ammonium nitrate solution, the reaction mass was allowed to stand for a period of time and the setting characteristics noted. Table III which follows summarizes the data obtained in this study.

TABLE III

| Run No. | Setting Agent | | Ammonium Nitrate Solution (g.) | Remarks |
|---|---|---|---|---|
| | Type | Amount (g.) | | |
| 1 | CaO [1] | 1 | >1 | Mix set up rapidly with some heating into a strong, hard mass. |
| 2 | MgO [1] | 1 | 1.4 | Original mixture was paste-like with no evidence of heating. Good mix was obtained which after 24 hours was in the form of a very hard, strong casting. |
| 3 | MgO [2] | 1 | 1.2 | Initial mix was paste-like which after 24 hours was in the form of a very hard, especially strong casting. |
| 4 | $Na_4P_2O_7$ (anh.) | 1 | 0.85 | Slurry formed upon initial mixing which began to harden quickly. Set up to a weak solid in about 5–10 minutes. Solid product was very strong and hard after 24 hours. |
| 5 | $Na_2SO_4$ (anh.) | 1 | 0.3 | Crystals moistened with little indication of a reaction. Hard, moderately strong solid casting formed. |
| 6 | PbO | 1.14 | 0.42 | Reacted very quickly and formed a wet-crumbly solid. |
| 7 | ZnO | 1 | 1 | Mixture formed a fluid paste. Set up overnight into a hard, very strong casting. |
| 8 | Drierite (anh.) $CaSO_4$ | 1 | 1 | Mix began to thicken and harden very soon after mixing and set into a hard mass after standing overnight. |
| 9 | $Na_2S_2O_3$ (anh.) | 1 | 0.37 | Set to fairly hard mass in about 1 minute with little stirring. Solid product was very hard after 24 hours. |
| 10 | $CaSO_4$ (anh.) [3] | 1 | 2 | Mix started to set in about 5 minutes. After standing 24 hours product was a very hard, strong mass. |

[1] Reagent grade. [2] Oxychloride grade. [3] 2.25 grams of crushed $NH_4NO_3$ prills also incorporated into this mix.

In a manner similar to that described for the foregoing examples, dense, set, water resistant explosive compositions can be prepared using saturated ammonium nitrate solution, magnesium oxide and particulate ammonium nitrate. Likewise other setting agents set forth hereinbefore can be used in conjunction with the other disclosed liquid and solid components to prepare dense water resistant explosive compositions.

Various modifications can be made in the present invention without departing from the spirit or scope thereof for it is understood that I limit myself only as defined in the appended claims.

I claim:
1. An explosive composition which comprises:
   (a) from about 40 to about 75 parts by weight particulate ammonium nitrate,
   (b) from about 20 to about 35 parts by weight of a solution selected from the group consisting of aqueous magnesium nitrate, aqueous ammonium nitrate and aqueous ammoniacal ammonium nitrate, and
   (c) at least about 2 parts by weight of a setting agent member selected from the group consisting of alkaline earth metal oxides, zinc oxide, lead monoxide, calcined dolomitic limestone, substantially anhydrous calcium sulfate, substantially anhydrous magnesium sulfate, substantially anhydrous sodium tetrapyrophosphate and substantially anhydrous sodium thiosulfate, said member being further characterized in setting said composition to a solid material which contains solvent used in the liquid phase.

2. The composition as defined in claim 1 wherein the setting agent is an alkaline earth metal oxide and is characterized in that it reacts with the solvent of the nitrate solution over a period of time and sets said composition to a solid containing said solvent member.

3. The explosive composition as defined in claim 2 wherein the setting agent is magnesium oxide.

4. The explosive composition as defined in claim 2 and having up to about 50 parts by weight of a particulated light metal.

5. The explosive composition as defined in claim 2 which comprises:
   (a) from about 50 to about 70 parts by weight prilled ammonium nitrate.
   (b) from about 22 to about 28 parts by weight of a substantially saturated solution selected from the group consisting of aqueous magnesium nitrate, aqueous ammonium nitrate and aqueous ammoniacal ammonium nitrate, and
   (c) from about 4 to about 8 parts by weight magnesium oxide to effect solidification of said composition.

6. The explosive composition as defined in claim 5 and having from about 2 to about 25 parts by weight of particulated aluminum.

7. A method for preparing a dense, water-resistant inorganic based explosive composition which comprises:
   (a) blending from about 40 to about 75 parts by weight solid particulate ammonium nitrate with at least about 2 parts by weight of a member selected from the group consisting of alkaline earth metal oxides, zinc oxide, lead monoxide, calcined dolomitic limestone, substantially anhydrous calcium sulfate, substantially anhydrous magnesium sulfate, substantially anhydrous sodium tetrapyrophosphate and substantially anhydrous sodium thiosulfate, said member being further characterized in setting said composition to a solid material which contains solvent used in the liquid phase of a solution selected from the group consisting of aqueous magnesium nitrate, aqueous ammonium nitrate and aqueous ammoniacal ammonium nitrate,
   (b) adding to the resulting blend from about 20 to about 35 parts by weight of a solution selected from the group consisting of aqueous magnesium nitrate, aqueous ammonium nitrate and aqueous ammoniacal ammonium nitrate,
   (c) mixing the liquid and solid components to provide a substantially homogeneous composition,
   (d) curing said composition at ambient temperature for a period of from about 12 to about 24 hours thereby to provide a dense, set, water resistant explosive composition.

8. The process as defined in claim 7 employing from about 50 to about 70 parts by weight prilled ammonium nitrate and from about 4 to about 8 parts by weight magnesium oxide to provide the initial blend of solids and having from about 22 to about 28 parts by weight of a substantially saturated solution selected from the group consisting of aqueous magnesium nitrate, aqueous ammonium nitrate and aqueous ammoniacal ammonium nitrate mixed therewith.

9. The process as defined in claim 7 and including the step of incorporating up to about 50 parts by weight of a particulated light metal into the initial blend of solids.

10. In an explosive composition comprising a particulate inorganic oxidizer selected from the group consisting of ammonium nitrate, ammonium perchlorate, potassium nitrate, barium nitrate, sodium nitrate and mixtures thereof and a substantially saturated solution selected from the group consisting of aqueous magnesium nitrate, aqueous ammonium nitrate and aqueous ammoniacal ammonium nitrate, the improvement which comprises blending into said explosive composition at least about 2 parts by weight of a setting agent selected from the group consisting of alkaline earth metal oxides, zinc oxide, lead monoxide, calcined dolomitic limestone, substantially anhydrous calcium sulfate, substantially anhydrous magnesium sulfate, substantially anhydrous sodium tetrapyrophosphate and substantially anhydrous sodium thiosulfate, said setting agent being characterized in setting said explosive composition to a solid material which contains solvent used in the liquid phase.

References Cited

UNITED STATES PATENTS 3,212,944  10/1965  Lyon et al. _____ 149—2 X
3,266,960  8/1966  Lyon et al. _____ 149—2 X CARL D. QUARFORTH, *Primary Examiner.*

L. A. SEBASTIAN, *Assistant Examiner.*